(No Model.)
J. DAVIS.
PIPE COUPLING.
No. 382,514. Patented May 8, 1888.
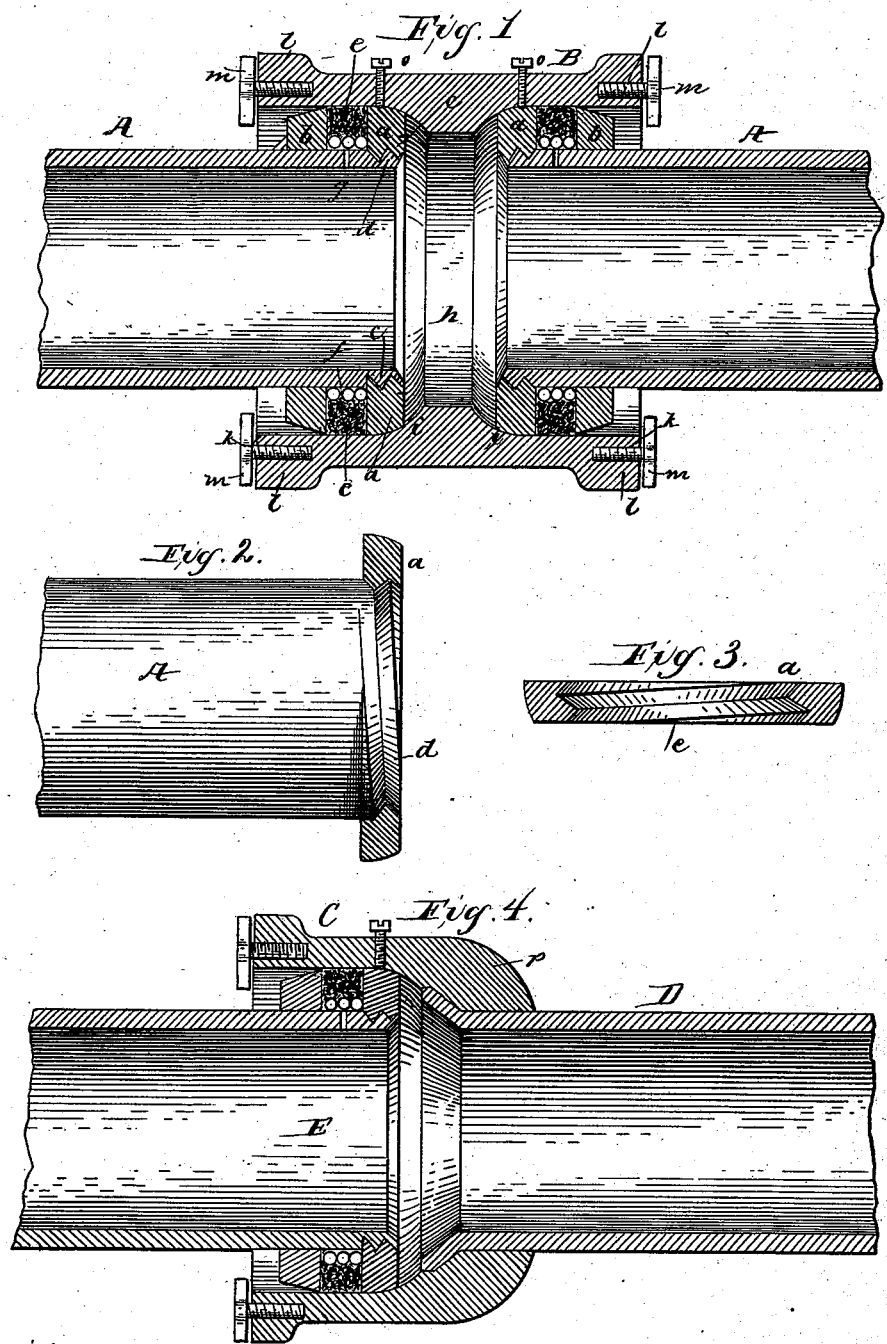
Witnesses,
Wm. H. Scott
Wm. E. Dyre
Inventor,
John Davis
By Johnston, Reinohl & Dyre
Attorneys

UNITED STATES PATENT OFFICE.

JOHN DAVIS, OF ALLEGHENY, PENNSYLVANIA.

PIPE-COUPLING.

SPECIFICATION forming part of Letters Patent No. 382,514, dated May 8, 1888.

Application filed November 3, 1887. Serial No. 254,210. (No model.)

*To all whom it may concern:*

Be it known that I, JOHN DAVIS, a citizen of the United States, residing at Allegheny, in the county of Allegheny and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention relates to pipe-couplings, and has for its object the construction of a detachable coupling which will accommodate itself to variations in the alignment of the line of pipe and utilize the pressure of the fluid in the pipe to expand the packing.

The invention will be hereinafter described, and particularly pointed out in the claims.

In the accompanying drawings, which form a part of this specification, Figure 1 is a vertical longitudinal section. Fig. 2 is a side view of one end of a pipe, showing the end or front ring in section. Fig. 3 is a section of the end ring, and Fig. 4 a vertical longitudinal section of a modified construction.

Reference being had to the drawings and the letters marked thereon, A A represent pipes, and B a sleeve separate from the pipes. On the end of each pipe are two rings, $a\ b$. The former is convex in cross-section and is provided with a coarse internal screw-thread, $c$, which makes about one revolution and a half in the depth or width of said ring and engages with a corresponding screw-thread, $d$, on the end of the pipe A. The ring $b$ is angular on its outer surface, as shown, or its walls may be parallel, if sufficient space is allowed for deflections of the pipe. In cast-iron pipes the ring $b$ may be cast integral with the pipe, and the coarse screw-thread may also be cast thereon, and in wrought-iron pipe or drawn tubing the ring $b$ may be swaged, welded, or shrunk on, provided no space is left between it and the pipe to which it is attached, and the screw-thread formed by compression of the metal, or it may be cut by a die in the usual manner. The end or point ring, $a$, may be cast with the screw-thread $c$ in it, or it may be formed in any approved manner.

Between the rings $a\ b$ is inserted a packing-ring, $e$, of rubber properly coated, or other suitable packing material, and between the packing-ring and the outer surface of the pipe is a chamber containing a spiral spring, $f$, to keep the packing expanded when the pressure in the pipes is light, or when there is no pressure on. The fluid in the pipe is admitted to the chamber containing the spring $f$ through an aperture, $g$, for expanding the packing when the pipes are filled with a fluid under pressure.

The sleeve B is provided with a projection, $h$, in the center, to furnish seats for the rings $a$ and keep the pipes from abutting when deflected, and from which the surface curves at $i$ to conform to the contour of the ring $a$, and terminates in straight surfaces $k$. To prevent the pipes from separating, bolts $l$, with elongated heads $m$, are inserted in the end of the sleeve B. Through the sleeve B are inserted set-screws $o$, which bear upon the outer surface of the rings $a$ and hold them in position while the pipe A is being screwed into said ring $a$.

In Fig. 4 I have shown a construction in which a bell, C, is secured to one end of a pipe, D, by swaging or expanding the end, as shown at $p$; but in the construction of cast-iron pipes the bell is cast integral with the pipe. The interior of the bell C is the same as the sleeve B, and the spigot end of the pipe E is provided with rings and packing corresponding with the rings and packing on pipe A.

To connect two pipes, the rings $a$ are inserted in the sleeve B and connected to the sleeve by separate chains, or they may be connected to each other by a single chain and the rings secured in their seats in the sleeve by the set-screw $o$. The packing-ring is next placed in position in the sleeve, and the spring $g$ is then contracted by a device for the purpose and placed within the elastic packing-ring, after which the pipe A is inserted in the sleeve until it strikes against the ring $a$, and the pipe turned or revolved about one and a half times, when the ring $a$ will have become seated on the end of the pipe, and at the same time have forced the elastic packing against the metallic ring $b$, so as to make the joint perfectly secure from leakage. The set-screw is then slackened, when the pipe will be free to change its position to accommodate variations in the alignment of the pipe.

Having thus fully described my invention, what I claim is—

1. A pipe-coupling consisting of a sleeve or bell having a ring secured thereto, which is provided with a coarse internal screw-thread and a set-screw through its wall, in combination with a pipe having a corresponding coarse screw-thread on its end and provided with a fixed ring or collar, and a packing-ring adjacent thereto, substantially as described.

2. A pipe-coupling consisting of a sleeve or bell having a concave portion at its base, in combination with a ring having a convex outer surface and an internal screw-thread, a set-screw extending through the wall of the bell and bearing upon said ring, a pipe having a screw-thread on its end and provided with a fixed ring or collar and a packing-ring, substantially as described.

In testimony whereof I affix my signature in presence of two witnesses.

JOHN DAVIS.

Witnesses:
R. T. PEARSON.
THOS. G. SAMPLE.